US012515580B2

(12) United States Patent
Tsuchiya et al.

(10) Patent No.: US 12,515,580 B2
(45) Date of Patent: Jan. 6, 2026

(54) VEHICLE HEADLIGHT HAVING A CONTROLLER THAT MOVES THE LIGHT DISTRIBUTION DURING TEMPERATURE DERATING OF A LIGHT SOURCE

(71) Applicant: KOITO MANUFACTURING CO., LTD., Tokyo (JP)

(72) Inventors: Toshiyuki Tsuchiya, Shizuoka (JP); Shuji Matsuura, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 57 days.

(21) Appl. No.: 18/711,803

(22) PCT Filed: Nov. 22, 2022

(86) PCT No.: PCT/JP2022/043093
§ 371 (c)(1),
(2) Date: Nov. 4, 2024

(87) PCT Pub. No.: WO2023/095766
PCT Pub. Date: Jun. 1, 2023

(65) Prior Publication Data
US 2025/0353427 A1 Nov. 20, 2025

(30) Foreign Application Priority Data
Nov. 24, 2021 (JP) .................................. 2021-190274

(51) Int. Cl.
*F21S 41/657* (2018.01)
*B60Q 1/08* (2006.01)

(52) U.S. Cl.
CPC ............ *B60Q 1/085* (2013.01); *F21S 41/657* (2018.01)

(58) Field of Classification Search
CPC .................................. F21S 41/65; B60Q 1/085
See application file for complete search history.

(56) References Cited

U.S. PATENT DOCUMENTS

| 12,215,836 | B2 * | 2/2025 | Mochizuki ............... F21S 45/10 |
| 2014/0361685 | A1 | 12/2014 | Yamamichi et al. |
| 2016/0169471 | A1 | 6/2016 | Saito |
| 2018/0242421 | A1 | 8/2018 | Ohta et al. |

(Continued)

FOREIGN PATENT DOCUMENTS

| DE | 10 2008 036 193 A1 | 2/2010 |
| DE | 10 2012 219 707 A1 | 1/2014 |

(Continued)

OTHER PUBLICATIONS

International Search Report for International Application No. PCT/JP2022/043093 dated Jan. 31, 2023.

(Continued)

*Primary Examiner* — Robert J May
(74) *Attorney, Agent, or Firm* — Sughrue Mion, PLLC

(57) ABSTRACT

A vehicle headlight (1) includes a first light source unit (20), a second light source unit (40), and a controller (CO), in which the controller (CO) moves at least an upper edge of a low beam light distribution pattern (101) upward in a case of performing temperature derating on the second light source unit (40) based on a temperature of the second light source unit (40) in a state where a high beam light distribution pattern (105) is formed.

6 Claims, 11 Drawing Sheets

(56) References Cited

U.S. PATENT DOCUMENTS

2019/0359119 A1  11/2019  Brouillard-Turgeon
2023/0225025 A1* 7/2023   Taleb .................. H05B 47/105
                                                315/309

FOREIGN PATENT DOCUMENTS

| EP | 4 265 475 A1 | 10/2023 |
|----|--------------|---------|
| JP | 2016-185717 A | 10/2016 |
| JP | 2018-134981 A | 8/2018 |

OTHER PUBLICATIONS

Extended European Search Report dated Jan. 31, 2025 from the European Patent Office in Application No. 22898549.5.

* cited by examiner

VEHICLE HEADLIGHT HAVING A CONTROLLER THAT MOVES THE LIGHT DISTRIBUTION DURING TEMPERATURE DERATING OF A LIGHT SOURCE

TECHNICAL FIELD

The present invention relates to a vehicle headlight.

BACKGROUND ART

A vehicle headlight may include a light source unit including a light emitting unit such as a light emitting diode (LED) and a circuit board on which the light emitting unit is mounted. In such a vehicle headlight, when the temperature of the light source unit becomes a predetermined value or more, the duty ratio of the light emitting unit may be decreased according to the temperature. When the duty ratio is decreased, the amount of heat generated from the light emitting unit is reduced, so that the light emitting unit is protected from heat. Such control of the duty ratio is called temperature derating, and Patent Literature 1 below discloses a lamp that performs temperature derating.
[Patent Literature 1] JP 2018-134981 A

SUMMARY OF INVENTION

In a vehicle headlight, a high beam light distribution pattern may be formed by a low beam light distribution pattern and an additional light distribution pattern added to the low beam light distribution pattern. The additional light distribution pattern tends to be darker on the upper and lower edge sides than on the center side. When temperature derating is performed on the light emitting unit that emits light for forming the additional light distribution pattern in a state where the high beam light distribution pattern is formed, the center side of the additional light distribution pattern becomes dark, and the lower edge side of the additional light distribution pattern also becomes dark accordingly. When the additional light distribution pattern becomes dark as described above, the frontal visibility may be deteriorated.

Therefore, an object of the present invention is to provide a vehicle headlight that can suppress deterioration in frontal visibility when temperature derating is performed.

In order to achieve the above object, a vehicle headlight according to the present invention includes: a first light source unit that emits first light for forming a low beam light distribution pattern to a front of a vehicle; a second light source unit that emits second light for forming an additional light distribution pattern to be added to the low beam light distribution pattern to form a high beam light distribution pattern; and a controller, in which the controller moves at least an upper edge of the low beam light distribution pattern upward in a case of performing temperature derating on the second light source unit based on a temperature of the second light source unit in a state where the high beam light distribution pattern is formed.

With the above configuration, as the upper edge of the low beam light distribution pattern moves upward, an upper edge side of the low beam light distribution pattern can brighten a lower edge side of the additional light distribution pattern that becomes dark due to the temperature derating. Therefore, deterioration in frontal visibility can be suppressed.

The controller may move the upper edge of the low beam light distribution pattern upward before the temperature derating in a case of performing the temperature derating on the second light source unit.

When the upper edge of the low beam light distribution pattern moves upward after the temperature derating contrary to the above configuration, two peaks may be formed in the intensity distribution of the high beam light distribution pattern by a region where the intensity is highest in the low beam light distribution pattern and a region where the intensity is highest in the additional light distribution pattern during a period from the temperature derating to the movement of the upper edge of the low beam light distribution pattern. When the two peaks are formed, in the high beam light distribution pattern, a region corresponding to an intensity valley portion between the two peaks tends to be darker than the regions on both sides of the valley. In a case where the region corresponding to the valley portion is located in the area where the line of sight of the driver is directed, the driver recognizes that the area where the line of sight is directed is darker than the other areas, and the visibility may be deteriorated. However, in the above configuration, the upper edge of the low beam light distribution pattern moves upward before the temperature derating, and thus, formation of the valley between two peaks can be suppressed. Therefore, deterioration in visibility can be suppressed as compared with a case where the valley is formed.

The controller may increase a movement amount of the upper edge of the low beam light distribution pattern according to a traveling speed of the vehicle in a case of performing the temperature derating on the second light source unit.

With the above configuration, when the vehicle travels fast, the movement amount of the upper edge is larger than that when the vehicle travels slow, and thus, a driver can visually recognize a far place in a bright state, so that the safety can be improved.

The controller may move at least an upper edge of the additional light distribution pattern upward in a case of performing the temperature derating on the second light source unit.

When the controller performs the temperature derating on the second light source unit, the center side of the additional light distribution pattern becomes dark and the upper edge side becomes darker than before the temperature derating. When the upper edge side becomes darker, the driver tends to feel uncomfortable as if the upper edge is lowered. In the above configuration, in a case of performing the temperature derating on the second light source unit, the controller moves at least the upper edge of the additional light distribution pattern upward. When the upper edge of the additional light distribution pattern moves upward, the area where the line of sight of the driver is directed when the driver visually recognizes a far place becomes bright, and it is possible to suppress that the driver feels uncomfortable as if the upper edge is lowered, and it is possible to suppress deterioration in visibility.

The controller may move a lower edge of the additional light distribution pattern upward by a smaller movement amount than the upper edge of the low beam light distribution pattern in a case of performing the temperature derating on the second light source unit.

When the lower edge of the additional light distribution pattern moves upward by a larger movement amount than the upper edge of the low beam light distribution pattern contrary to the above configuration, the lower edge may be separated upward from the upper edge. In this case, as described above, two peaks may be formed in the intensity distribution of the high beam light distribution pattern. However, in the above configuration, the lower edge of the additional light distribution pattern moves upward by a smaller movement amount than the upper edge of the low beam light distribution pattern, and thus, it is possible to suppress the lower edge from being separated upward from the upper edge. Therefore, formation of the valley between two peaks can be suppressed, and deterioration in visibility can be suppressed.

The controller may move a lower edge of the additional light distribution pattern upward after the movement of the upper edge of the low beam light distribution pattern in a case of performing the temperature derating on the second light source unit.

When the lower edge of the additional light distribution pattern moves upward before the upper edge of the low beam light distribution pattern contrary to the above configuration, the lower edge is separated upward from the upper edge, and two peaks may be formed in the intensity distribution of the high beam light distribution pattern as described above. However, in the above configuration, the lower edge of the additional light distribution pattern moves upward after the movement of the upper edge of the low beam light distribution pattern, and thus, the lower edge can be suppressed from being separated upward from the upper edge. Therefore, formation of the valley between two peaks described above can be suppressed, and deterioration in visibility can be suppressed.

As described above, according to the present invention, it is possible to provide a vehicle headlight capable of suppressing deterioration in frontal visibility when temperature derating is performed.

DESCRIPTION OF EMBODIMENTS

Figure 1:
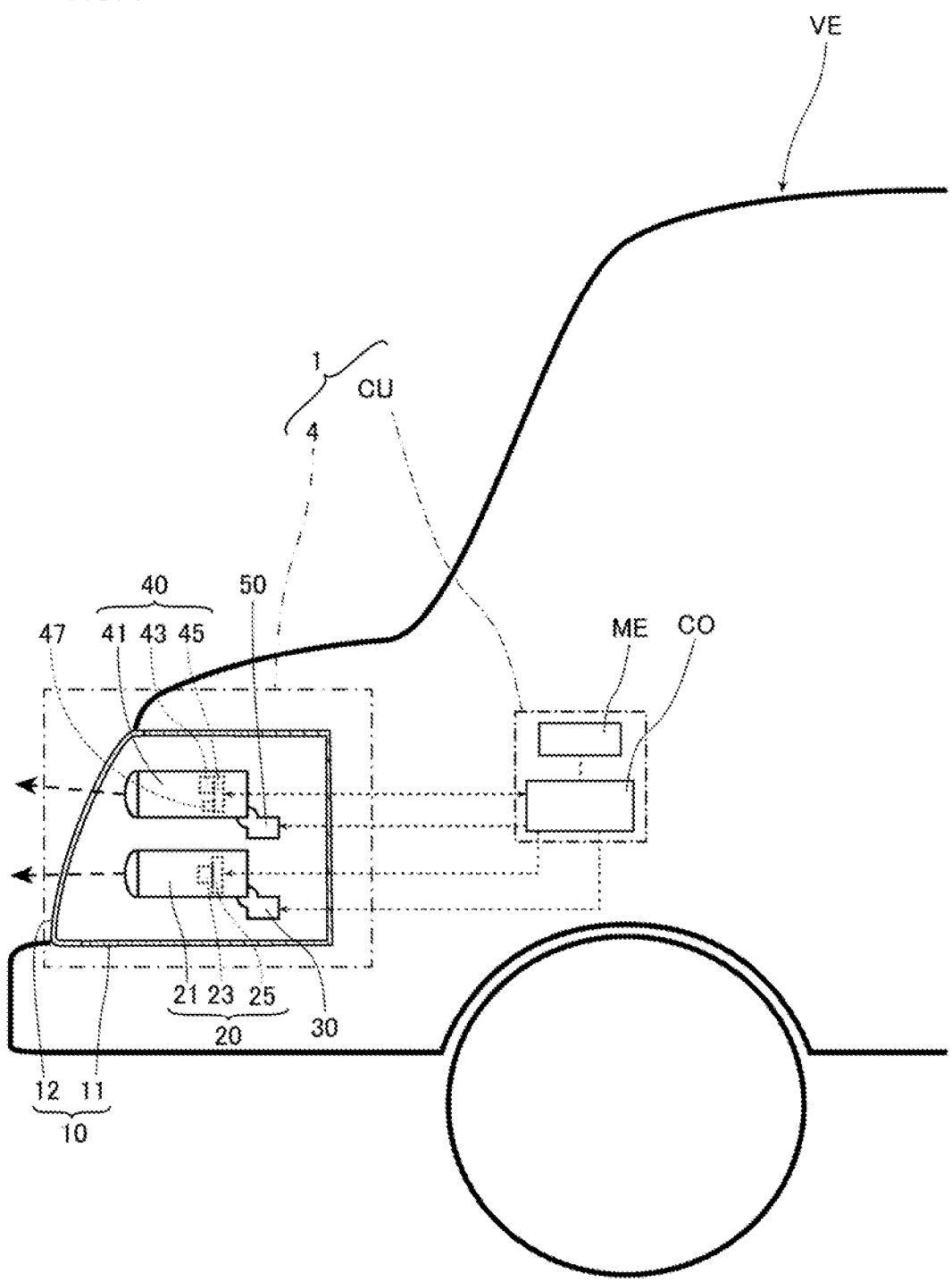
FIG. 1 is a schematic diagram illustrating a vehicle including a vehicle headlight according to an embodiment of the present invention.

Hereinafter, a preferred embodiment of a vehicle headlight according to the present invention will be described in detail with reference to the drawings.

Embodiments exemplified below are intended to facilitate understanding of the present invention and are not intended to limit the present invention. The present invention can be changed and modified without departing from the gist of the present invention. In the present invention, constituent elements in the following embodiments may be appropriately combined. In the drawings referred to below, dimensions of each member may be changed for easy understanding.

FIG. 1 is a schematic diagram illustrating a vehicle including a vehicle headlight according to the present embodiment. As illustrated in FIG. 1, a vehicle headlight 1 according to the present embodiment includes a lamp unit 4 and a control unit CU. The vehicle headlight 1 is for an automobile and is generally provided at each of left and right portions on a front side of a vehicle VE. In the present specification, "right" refers to a right side of the vehicle VE in a forward movement direction, and "left" refers to a left side of the vehicle VE in the forward movement direction. Each of the left and right vehicle headlights 1 has the same configuration except that shapes thereof are substantially symmetrical to each other in a horizontal direction. Therefore, one vehicle headlight 1 will be described below.

The lamp unit 4 is disposed on the front side of the vehicle VE, and includes a casing 10, a first light source unit 20, an actuator 30, a second light source unit 40, a temperature sensor 47, and an actuator 50 as main components.

The casing 10 mainly includes a housing 11 and an outer cover 12. The housing 11 is formed in a box shape having an opening on a front side, and the outer cover 12 is fixed to the housing 11 in such a way as to close the opening. In this way, an accommodation space surrounded by the housing 11 and the outer cover 12 is formed in the casing 10, and the first light source unit 20, the actuator 30, the second light source unit 40, the temperature sensor 47, and the actuator 50 are disposed in the accommodation space. The outer cover 12 transmits light emitted from each of the first light source unit 20 and the second light source unit 40. The control unit CU is disposed outside the casing 10, and may be disposed in the accommodation space of the casing 10.

The first light source unit 20 emits first light for forming a low beam light distribution pattern to the front of the vehicle VE. The first light source unit 20 mainly includes a first casing 21 having the same configuration as the casing 10, and a first light emitting unit 23 and a first circuit board 25 disposed in an accommodation space of the first casing 21. In the accommodation space of the first casing 21, an optical member such as a reflector or a projection lens, a shade, or the like may be disposed in such a way that the first light forms the low beam light distribution pattern.

Examples of the first light emitting unit 23 include a light emitting diode (LED). The first light emitting unit 23 is mounted on the first circuit board 25. When power is supplied from a power supply unit (not illustrated) via the first circuit board 25, the first light emitting unit 23 emits the first light forward.

The actuator 30 is connected to the first casing 21, and is configured to be able to change an inclination of the first light source unit 20 in a vertical direction. The inclination of the first light source unit 20 in the vertical direction is changed by the actuator 30 in a range of, for example, 0.01 degrees to 5 degrees. Inclinations of the first light and the low beam light distribution pattern in the vertical direction are changed according to a change amount of the inclination of the first light source unit 20.

The second light source unit 40 emits second light for forming an additional light distribution pattern to be added to the low beam light distribution pattern to form a high beam light distribution pattern. The second light source unit 40 mainly includes a second casing 41 having the same configuration as the casing 10, and a plurality of second light emitting units 43 and a second circuit board 45 disposed in an accommodation space of the second casing 41. In the accommodation space of the second casing 41, an optical member such as a reflector or a projection lens, a shade, or the like may be disposed in such a way that the second light forms the additional light distribution pattern similarly to the first casing 21. The second light emitting unit 43 and the second circuit board 45 are described below with reference to FIG. 2.

The actuator 50 is connected to the second casing 41, and is configured to be able to change inclinations of the second light source unit 40 in the vertical and horizontal directions. The inclination of the second light source unit 40 in the vertical direction is changed by the actuator 50 in a range of, for example, 0.01 degrees to 5 degrees. The inclination of the second light source unit 40 in the horizontal direction is changed by the actuator 50 in a range of, for example, 1 degree to 30 degrees. Inclinations of the second light and the additional light distribution pattern in the vertical and horizontal directions are changed according to a change amount of the inclination of the second light source unit 40.

The control unit CU includes a memory ME and a controller CO.

The memory ME is configured to record information, and the recorded information can be read from the memory ME. The memory ME is, for example, a non-transitory recording medium, and is preferably a semiconductor recording medium such as a random access memory (RAM) or a read only memory (ROM), and can include a recording medium of any format such as an optical recording medium or a magnetic recording medium. Note that the "non-transitory" recording medium includes all computer-readable recording media except for a transitory propagating signal, and does not exclude a volatile recording medium. Note that the memory ME may be provided inside the controller CO.

The controller CO includes, for example, an integrated circuit such as a microcontroller, an integrated circuit (IC), a large-scale integrated circuit (LSI), or an application specific integrated circuit (ASIC), or a numerical control (NC) device. In addition, in a case where the NC device is used, the controller CO may use a machine learning device or does not have to use a machine learning device. The controller CO controls some components of the vehicle headlight 1.

The controller CO is electrically connected to the actuators 30 and 50, and controls the actuators 30 and 50 to adjust the inclination of the first light source unit 20 in the vertical direction and the inclinations of the second light source unit 40 in the vertical and horizontal directions. By adjusting the inclinations, the inclination of each of the first light emitted from the first light source unit 20, the second light emitted from the second light source unit 40, the low beam light distribution pattern, the additional light distribution pattern, and the high beam light distribution pattern is adjusted.

The controller CO is electrically connected to the first light source unit 20 and the second light source unit 40 via the power supply unit (not illustrated), and controls the first light source unit 20 and the second light source unit 40. That is, the controller CO controls whether or not to emit each of the first light and the second light and adjusts the intensity of each light.

The controller CO adjusts power to be supplied to the first light emitting unit 23 and the second light emitting unit 43 by, for example, pulse width modulation (PWM) control. In this case, the controller CO adjusts the power to be supplied to each of the first light emitting unit 23 and the second light emitting unit 43 by adjusting a duty ratio of each of the first light emitting unit 23 and the second light emitting unit 43, and adjusts a light emission amount of each of the first light emitting unit 23 and the second light emitting unit 43 by adjusting the power. The greater the duty ratio, the greater the power applied to each of the first light emitting unit 23 and the second light emitting unit 43. A light intensity distribution in each of the low beam light distribution pattern and the additional light distribution pattern is adjusted by adjusting the light emission amount.

Figure 2:
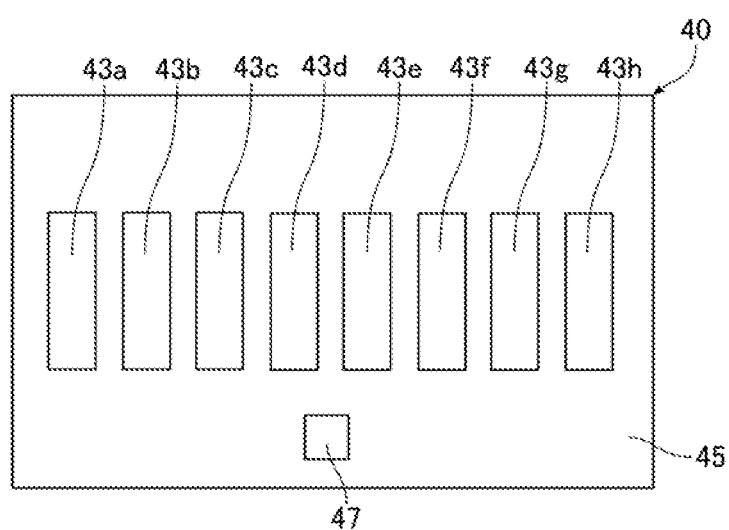
FIG. 2 is a front view schematically illustrating a second light source unit.

FIG. 2 is a front view schematically illustrating the second light source unit 40. In FIG. 2, illustration of the second casing 41 is omitted. In FIG. 2, the second light emitting units 43 are illustrated as second light emitting units 43*a* to 43*h*.

Examples of the second light emitting units 43*a* to 43*h* include LEDs. The second light emitting units 43*a* to 43*h* are arrayed in a line in the horizontal direction and mounted on the second circuit board 45. When power is supplied from the power supply unit (not illustrated) via the second circuit board 45, each of the second light emitting units 43*a* to 43*h* emits the second light forward.

The second light emitting units 43*a* to 43*h* generate heat when emitting the second light. The heat of each of the second light emitting units 43*a* to 43*h* is transferred to the second circuit board 45. As the supplied power increases, a light emission amount and a heat generation amount of each of the second light emitting units 43*a* to 43*h* increase, and a temperature of the second light source unit 40 increases. Since a heat generation amount of the second circuit board 45 is extremely smaller than the total heat generation amount of the second light emitting units 43*a* to 43*h*, the temperature of the second light source unit 40 can be regarded as a temperature based on the total heat generation amount of the second light emitting units 43*a* to 43*h*.

The temperature sensor 47 is mounted on the second circuit board 45 and estimates the temperature of the second light source unit 40. Examples of such a temperature sensor 47 include a thermistor. The temperature sensor 47 is electrically connected to the controller CO, and outputs a temperature signal related to the estimated temperature to the controller CO. The temperature sensor 47 according to the present embodiment is disposed away from each of the second light emitting units 43*a* to 43*h*, and the temperature of the heat of each of the second light emitting units 43*a* to 43*h* may decrease when the heat of each of the second light emitting units 43*a* to 43*h* is transferred to the temperature sensor 47. Therefore, the controller CO may estimate the temperature of the second light source unit 40 based on the temperature signal output from the temperature sensor 47 and a distance between each of the second light emitting units 43*a* to 43*h* and the temperature sensor 47.

A configuration and attachment position of the temperature sensor 47 are not particularly limited as long as the temperature sensor 47 can estimate the temperature of the second light source unit 40. For example, the temperature sensor 47 may be attached to each of the second light emitting units 43*a* to 43*h*, may be disposed in the accommodation space of the second casing 41, or may be mounted on another circuit board electrically connected to the second circuit board 45. The temperature sensor 47 is, for example, a thermistor, and may be a thermocouple. In addition, the controller CO may estimate the temperature of the second light source unit 40 based on the amount of power of each of the second light emitting units 43*a* to 43*h*.

Figure 3:
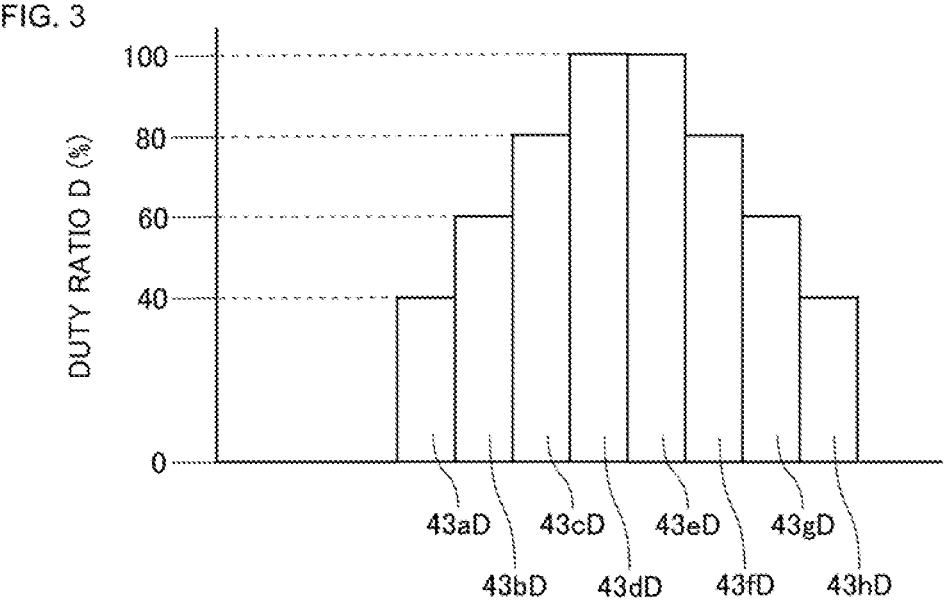
FIG. 3 is a diagram for describing a duty ratio.

Duty ratios 43*a*D to 43*h*D of the second light emitting units 43*a* to 43*h* when the vehicle VE travels straight will be described below. FIG. 3 is a diagram for describing the duty ratios 43*a*D to 43*h*D, and in FIG. 3, values of the duty ratios 43*a*D to 43*h*D are represented by heights of rectangles illustrated in FIG. 3.

The controller CO maximizes the duty ratios 43dD and 43eD of the second light emitting units 43d and 43e located at the center in the horizontal direction among the second light emitting units 43a to 43h. The controller CO decreases the duty ratio stepwise from the second light emitting unit 43d toward the left side and from the second light emitting unit 43e toward the right side. In the present embodiment, the controller CO sets the duty ratios 43dD to 43aD of the second light emitting units 43d to 43a to 100%, 80, 60%, and 40%, respectively. The controller 70 sets the duty ratios 43eD to 43hD of the second light emitting units 43e to 43h to 100%, 80, 60%, and 40% as described above. The values of the duty ratios 43aD to 43hD are recorded as information in the memory ME, and the controller CO reads the values from the memory ME and controls the duty ratios 43aD to 43hD as described above. The values of the duty ratios are not particularly limited.

When the controller CO controls the duty ratios 43aD to 43hD as described above, the light emission amounts of the second light emitting units 43d and 43e located at the center in the horizontal direction become the largest. In addition, second light emitting units located farther from the second light emitting units 43d and 43e toward the left and right ends have smaller light emission amounts. When the duty ratios are the same as each other, the light emission amounts are the same as each other, and thus the light emission amounts of the left and right second light emitting units among the second light emitting units 43a to 43h are symmetrical. As a result, a hot zone, which is a region where the intensity of the second light is highest in the additional light distribution pattern, is located substantially at the center of the additional light distribution pattern in the horizontal direction.

Each of the second light emitting units 43a to 43h generates heat when emitting the second light at the above-described duty ratio. The temperature of the second light source unit 40 associated with the heat generation of the second light emitting units 43a to 43h is estimated by the temperature sensor 47 as described above, and the temperature sensor 47 outputs the temperature signal to the controller CO. The controller CO performs temperature derating on each of the second light emitting units 43a to 43h of the second light source unit 40 based on the temperature signal.

Figure 4:
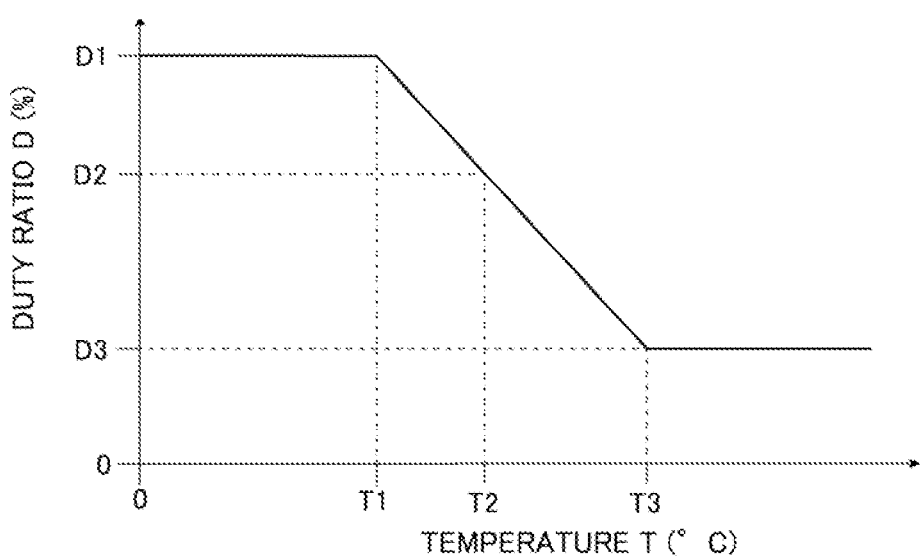
FIG. 4 is a diagram illustrating a relationship between a temperature T (° C.) of the second light source unit and each duty ratio D (%) of the second light emitting unit.

Next, the temperature derating in the second light source unit 40 will be described. FIG. 4 is a diagram illustrating a relationship between a temperature T (° C.) of the second light source unit 40 and a duty ratio D (%) of the second light emitting unit 43 estimated by the temperature sensor 47. The horizontal axis of FIG. 4 represents the temperature T, and the vertical axis of FIG. 4 represents the duty ratio D. In FIG. 4, temperatures T1, T2, and T3 are, for example, 80° C., 90° C., and 120° C., respectively. The temperature T1 is a temperature at which the controller CO starts the temperature derating. When the temperature T is lower than the temperature T1, the temperature derating is not performed, and when the temperature T is equal to or higher than the temperature T1, the temperature derating is performed. A duty ratio D1 corresponding to a temperature lower than the temperature T1 is set to 100%, and duty ratios D2 and D3 corresponding to the temperatures T2 and T3 are set to 70% and 30%, respectively, for example. A duty ratio corresponding to the temperature T1 is lower than the duty ratio D1 and higher than the duty ratio D2. As for the duty ratio D3, a decrease amount of the duty ratio in a case where the temperature derating is performed is maximized. A relationship between the temperature T and the duty ratio D, the values of the temperatures T1, T2, and T3, and the values of the duty ratios D2 and D3 are recorded as information in the memory ME. Note that these values are not particularly limited.

In the temperature derating, when the temperature T is equal to or higher than the temperature T1, the controller CO controls the duty ratio of the second light emitting unit 43 based on the duty ratio corresponding to the temperature T. For example, when the temperature T is the temperature T2, the controller CO controls the duty ratio of the second light emitting unit 43 based on the duty ratio D2. In the temperature derating according to the present embodiment, when the temperature T is equal to or higher than the temperature T1, the controller CO decreases the duty ratio of the second light emitting unit 43 higher than the duty ratio corresponding to the temperature T. In addition, the duty ratio of the second light emitting unit 43 driven at a duty ratio equal to or lower than the duty ratio corresponding to the temperature T is maintained. Such control of the duty ratio will be described below using the temperature T2 and the duty ratio D2 corresponding to the temperature T2, where the temperature at the time of performing the temperature derating is the temperature T2.

Figure 5:
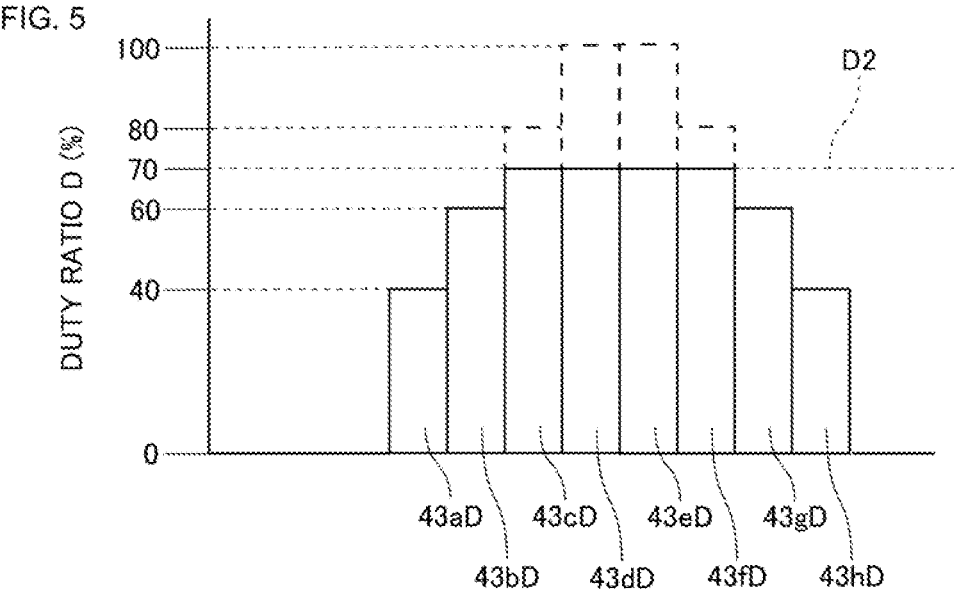
FIG. 5 is a diagram illustrating an example of a duty ratio of the second light emitting unit after temperature derating.

FIG. 5 is a diagram illustrating an example of the duty ratios 43aD to 43hD of the second light emitting units 43a to 43h after the temperature derating when the vehicle VE travels straight. In FIG. 5, similarly to FIG. 3, the duty ratios 43aD to 43hD are represented by heights of rectangles illustrated in FIG. 5. In addition, in order to compare the duty ratios 43aD to 43hD in FIGS. 3 and 5, a portion where the duty ratio is decreased from the state illustrated in FIG. 3 is indicated by a broken line in FIG. 5.

When the temperature T is the temperature T2, the controller CO decreases the duty ratios 43cD to 43fD, which are higher than the duty ratio D2, of the second light emitting units 43c to 43f among the second light emitting units 43a to 43h to the duty ratio D2, that is, 70%. The controller CO maintains the duty ratios 43aD, 43bD, 43gD, and 43hD of the second light emitting units 43a, 43b, 43g, and 43h which are equal to lower than the duty ratio D2 in the state illustrated in FIG. 3. When the duty ratios 43cD to 43fD decrease, the heat generation amount of the second light source unit 40 decreases, and the temperature of the second light source unit 40 decreases.

Next, an operation of the vehicle headlight 1 will be described.

Figure 6:
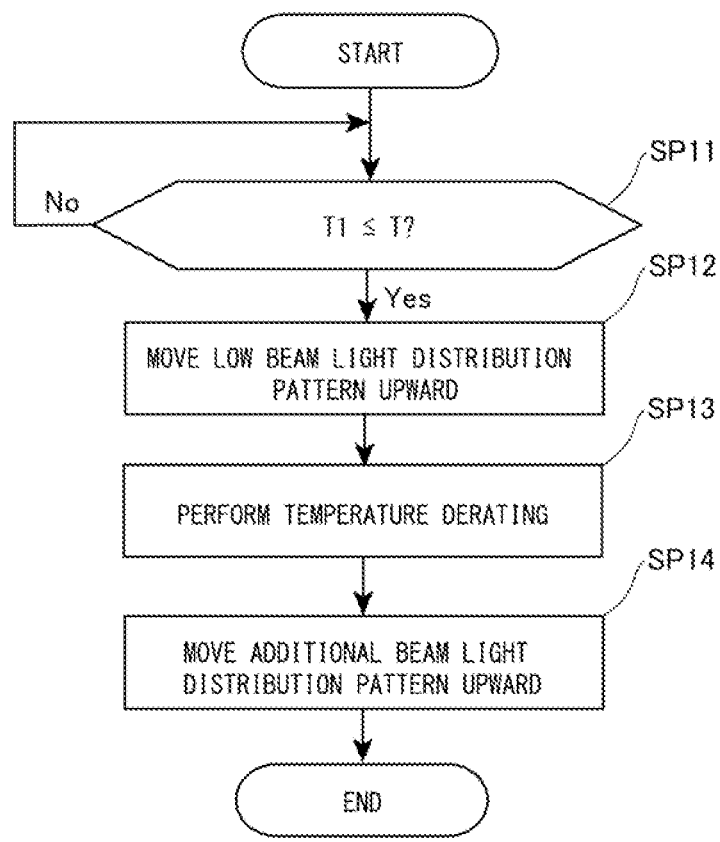
FIG. 6 is a diagram illustrating an example of a control flowchart of a controller according to the embodiment.

FIG. 6 is a diagram illustrating an example of a control flowchart of the controller CO according to the embodiment. As illustrated in FIG. 6, the control flow according to the present embodiment includes steps SP11 to SP14. Note that the control flow is not limited thereto. In the state of start illustrated in FIG. 6, it is assumed that the vehicle VE travels straight, the first light and the second light are emitted, and the high beam light distribution pattern is formed by the first light and the second light. The duty ratios 43aD to 43hD of the second light emitting units 43 that emit the second light are as illustrated in FIG. 3. In addition, in the state of start, it is assumed that the temperature sensor 47 estimates the temperature of the second light source unit 40 and the temperature signal is input to the controller CO.

(Step SP11)

In this step, in a case where the temperature T indicated by the temperature signal output from the temperature sensor 47 is lower than the temperature T1, the controller CO repeats step SP11. In a case where the temperature T is equal to or higher than the temperature T1, the controller CO advances the control flow to step SP12.

(Step SP12)

Figure 7:
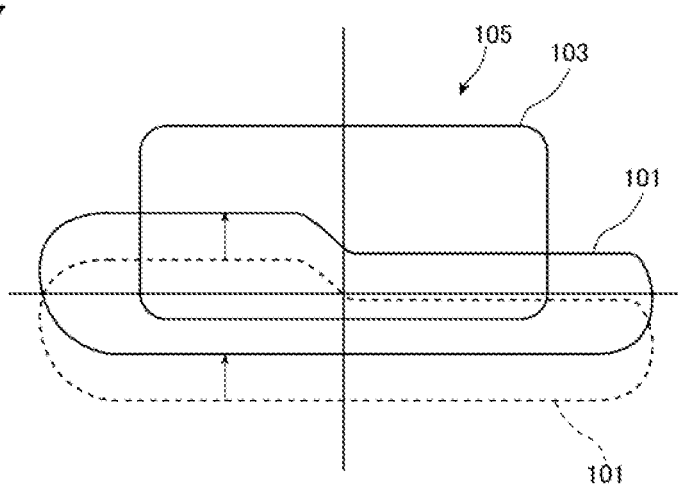
FIG. 7 is a view illustrating a change of a low beam light distribution pattern in step SP12.

In this step, the controller CO controls the actuator 30 to incline the first light source unit 20 upward and move at least an upper edge of the low beam light distribution pattern upward before the temperature derating. In the present embodiment, the entire first light source unit 20 is inclined, and thus, the controller CO moves a lower edge and the upper edge of the low beam light distribution pattern upward by the same movement amount. FIG. 7 is a view illustrating a change of a low beam light distribution pattern 101 in a high beam light distribution pattern 105. In FIG. 7, the low beam light distribution pattern 101 before the movement is indicated by a broken line, and the low beam light distribution pattern 101 after the movement is indicated by a solid line. In this step, an additional light distribution pattern 103 does not move. The light distribution patterns 101, 103, and 105 illustrated in FIG. 7 mean both shapes of images formed on a virtual vertical screen, for example, 25 m ahead of the vehicle VE, and light intensity distributions in the images. When the low beam light distribution pattern 101 moves upward, the low beam light distribution pattern 101 further overlaps a lower edge side of the additional light distribution pattern 103 by an upward movement amount of the upper edge of the low beam light distribution pattern 101 to make the overlapping lower edge side of the additional light distribution pattern 103 brighter.

In this step, in a case of performing the temperature derating on the second light source unit 40, the controller CO may increase the movement amount of the upper edge of the low beam light distribution pattern 101 according to a traveling speed of the vehicle VE. In this case, for example, information related to the speed is input to the controller CO from an electronic control unit (ECU) (not illustrated) of the vehicle VE, and the controller CO uses the information. With the above configuration, when the vehicle VE travels fast, the movement amount of the upper edge is larger than that when the vehicle VE travels slow, and thus, a driver can visually recognize a far place in a bright state, so that the safety can be improved. In a case of performing the temperature derating on the second light source unit 40, the controller CO does not have to increase the movement amount of the upper edge of the low beam light distribution pattern 101 according to the traveling speed of the vehicle VE.

In this step, in a case of performing the temperature derating on the second light source unit 40, the controller CO may increase a movement speed of the upper edge of the low beam light distribution pattern 101 according to the traveling speed of the vehicle VE. With the above configuration, when the vehicle VE travels fast, the movement speed of the upper edge is higher than that when the vehicle VE travels slow, and thus, the driver can visually recognize a far place quickly in a bright state, so that the safety can be improved. In a case of performing the temperature derating on the second light source unit 40, the controller CO does not have to increase the movement speed of the upper edge of the low beam light distribution pattern 101 according to the traveling speed of the vehicle VE.

Once the low beam light distribution pattern 101 is moved upward, the controller CO advances the control flow to step SP13.

(Step SP13)

In this step, the controller CO performs the temperature derating on the second light source unit 40. In the temperature derating, when the temperature T is the temperature T2, the controller CO controls the duty ratios 43aD to 43hD as described above with reference to FIG. 5. As a result, as described above, the heat generation amount of the second light source unit 40 decreases, and the temperature of the second light source unit 40 decreases. The controller CO performs the temperature derating, for example, one second after the end of the movement of the upper edge of the low beam light distribution pattern 101 in step SP12, but the temperature derating may be performed simultaneously with the end of the movement, and a timing of performing the temperature derating is not particularly limited.

The additional light distribution pattern 103 tends to be darker on the upper and lower edge sides than on the center side. When the controller CO performs the temperature derating as described above, the light emission amount of the second light source unit 40 decreases, the center side of the additional light distribution pattern 103 becomes dark, and the upper and lower edge sides of the additional light distribution pattern 103 become darker. As described in step SP12, the upper edge of the low beam light distribution pattern 101 moves upward with respect to the darkened additional light distribution pattern 103. Therefore, a decrease in brightness due to the temperature derating is suppressed on the lower edge side of the additional light distribution pattern 103.

After performing the temperature derating on the second light source unit 40, the controller CO advances the control flow to step SP14.

(Step SP14)

Figure 8:
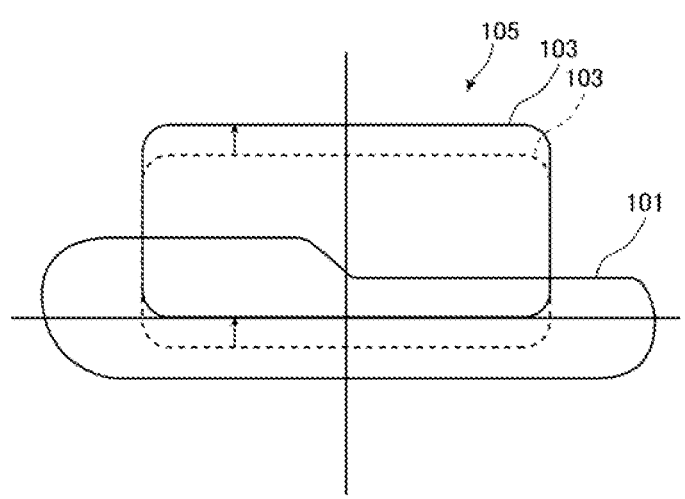
FIG. 8 is a view illustrating a change of an additional light distribution pattern in step SP14.

In this step, the controller CO controls the actuator 50 to incline the second light source unit 40 upward and move at least an upper edge of the additional light distribution pattern 103 upward. In the present embodiment, since the entire second light source unit 40 is inclined, the controller CO moves the lower edge and the upper edge of the additional light distribution pattern 103 upward by the same movement amount. The controller CO moves at least the upper edge of the additional light distribution pattern 103, for example, one second after the end of the temperature derating, and may move at least the upper edge of the additional light distribution pattern 103 simultaneously with the end of the movement, and a timing of the movement is not particularly limited. FIG. 8 is a view illustrating a change of the additional light distribution pattern 103 in the high beam light distribution pattern 105. In FIG. 8, the additional light distribution pattern 103 before the movement illustrated in FIG. 7 is indicated by a broken line, and the additional light distribution pattern 103 before the movement is indicated by a solid line. In this step, the controller CO moves the additional light distribution pattern 103 in a state where the additional light distribution pattern 103 visually overlaps the low beam light distribution pattern 101. In addition, the controller CO moves the additional light distribution pattern 103 upward by a smaller movement amount than the low beam light distribution pattern 101. This suppresses formation of a gap between the additional light distribution pattern 103 and the low beam light distribution pattern 101 in which the first light and the second light can be visually regarded as not overlapping each other by humans. When the controller CO performs the temperature derating in step SP13, the center side of the additional light distribution pattern 103 becomes dark and the upper edge side of the additional light distribution pattern 103 becomes darker as described above. When the upper edge side becomes darker, the driver visually tends to feel uncomfortable as if the upper edge of the additional light distribution pattern 103 is lowered and the additional light distribution pattern 103 is vertically narrowed. However, when the upper edge of the additional light distribution pattern 103 moves upward, an area where a line of sight of the driver is directed when the driver visually recognizes a far place becomes bright, and it is suppressed that the driver feels uncomfortable as if the upper edge is lowered.

In this step, in a case of performing the temperature derating on the second light source unit 40, the controller CO may increase the movement amount of the upper edge of the additional light distribution pattern 103 according to the traveling speed of the vehicle VE. With the above configuration, when the vehicle VE travels fast, the movement amount of the upper edge is larger than that when the vehicle VE travels slow, and thus, the driver can visually recognize a farther place, and the safety can be improved. In a case of performing the temperature derating on the second light source unit 40, the controller CO does not have to increase the movement amount of the upper edge of the additional light distribution pattern 103 according to the traveling speed of the vehicle VE.

In this step, in a case of performing the temperature derating on the second light source unit 40, the controller CO may increase the movement speed of the upper edge of the additional light distribution pattern 103 according to the traveling speed of the vehicle VE. With the above configuration, when the vehicle VE travels fast, the movement speed of the upper edge is higher than that when the vehicle VE travels slow, and thus, the driver can visually recognize a farther place more quickly, and the safety can be improved. In a case of performing the temperature derating on the second light source unit 40, the controller CO does not have to increase the movement speed of the upper edge of the additional light distribution pattern 103 according to the traveling speed of the vehicle VE.

Once the controller CO moves the additional light distribution pattern 103 upward, the controller CO ends the control flow.

As described above, in a case of performing the temperature derating on the second light source unit 40 based on the temperature signal output from the temperature sensor 47 in a state where the high beam light distribution pattern 105 is formed, the controller CO according to the present embodiment moves at least the upper edge of the low beam light distribution pattern 101 upward as described in step SP12.

With the above configuration, as the upper edge of the low beam light distribution pattern 101 moves upward, the upper edge side of the low beam light distribution pattern 101 can brighten the lower edge side of the additional light distribution pattern 103 that becomes dark due to the temperature derating. Therefore, deterioration in visibility can be suppressed.

In a case of performing the temperature derating on the second light source unit 40, the controller CO moves the upper edge of the low beam light distribution pattern 101 upward before the temperature derating as described in steps SP12 and SP13.

When the upper edge of the low beam light distribution pattern 101 moves upward after the temperature derating contrary to the above configuration, two peaks may be formed in the intensity distribution of the high beam light distribution pattern 105 by a region where the intensity is highest in the low beam light distribution pattern 101 and a region where the intensity is highest in the additional light distribution pattern 103 during a period from the temperature derating to the movement of the upper edge of the low beam light distribution pattern. When the two peaks are formed, in the high beam light distribution pattern 105, a region corresponding to an intensity valley portion between the two peaks tends to be darker than the regions on both sides of the valley. In a case where the region corresponding to the valley portion is located in the area where the line of sight of the driver is directed, the driver recognizes that the area where the line of sight is directed is darker than the other areas, and the visibility may be deteriorated. However, in the above configuration, the upper edge of the low beam light distribution pattern 101 moves upward before the temperature derating, and thus, formation of the valley between two peaks can be suppressed. Therefore, deterioration in visibility can be suppressed as compared with a case where the valley is formed.

In steps SP12 and SP13, the controller CO may perform the temperature derating during a period from the start to the end of the upward movement of the upper edge of the low beam light distribution pattern 101. In addition, the controller CO may simultaneously perform steps SP12 and SP13 to simultaneously start the movement of the upper edge of the low beam light distribution pattern 101 and the temperature derating, or may simultaneously end the movement of the upper edge and the temperature derating. Alternatively, the controller CO may advance the control flow in the order of step SP13, step SP12, and step SP14, and move the upper edge of the low beam light distribution pattern 101 after the temperature derating. In this case, the controller CO may move the upper edge of the low beam light distribution pattern 101, for example, one second after or simultaneously with the end of the temperature derating. Alternatively, the controller CO may start and end the movement of the upper edge of the low beam light distribution pattern 101 during the temperature derating. The controller CO may combine the above with a timing of each of the start of movement of the upper edge, the end of movement of the upper edge, the start of the temperature derating, and the end of the temperature derating.

In a case of performing the temperature derating on the second light source unit 40, the controller CO moves at least the upper edge of the additional light distribution pattern 103 upward as described in step SP14.

When the controller CO performs the temperature derating on the second light source unit 40, the center side of the additional light distribution pattern 103 becomes dark and the upper edge side becomes darker than before the temperature derating. When the upper edge side becomes darker, the driver tends to feel uncomfortable as if the upper edge is lowered. In the above configuration, in a case of performing the temperature derating on the second light source unit 40, the controller CO moves at least the upper edge of the additional light distribution pattern 103 upward. When the upper edge of the additional light distribution pattern 103 moves upward, the area where the line of sight of the driver is directed when the driver visually recognizes a far place becomes bright, and it is possible to suppress that the driver feels uncomfortable as if the upper edge is lowered, and it is possible to suppress deterioration in visibility. The controller CO does not have to move the upper edge of the additional light distribution pattern 103 upward.

In a case of performing the temperature derating on the second light source unit 40 in step SP14, the controller CO raises the lower edge of the additional light distribution pattern 103. In this case, the controller CO moves the lower edge of the additional light distribution pattern 103 upward by a smaller movement amount than the upper edge of the low beam light distribution pattern 101.

When the lower edge of the additional light distribution pattern 103 moves upward by a larger movement amount than the upper edge of the low beam light distribution pattern 101 contrary to the above configuration, the lower edge may be separated upward from the upper edge. In this case, as described above, two peaks may be formed in the intensity distribution of the high beam light distribution pattern 105. However, in the above configuration, the lower edge of the additional light distribution pattern 103 moves upward by a smaller movement amount than the upper edge of the low beam light distribution pattern 101, and thus, it is possible to suppress the lower edge from being separated upward from the upper edge. Therefore, formation of the valley between two peaks can be suppressed, so that deterioration in visibility can be suppressed as compared with a case where the valley is formed. The controller CO may move the lower edge of the additional light distribution pattern 103 upward by the same movement amount as the upper edge of the low beam light distribution pattern 101.

In a case of performing the temperature derating on the second light source unit 40, the controller CO moves the lower edge of the additional light distribution pattern 103 upward after the movement of the upper edge of the low beam light distribution pattern 101 as described in step SP12 and step SP14.

When the lower edge of the additional light distribution pattern 103 moves upward before the upper edge of the low beam light distribution pattern 101 contrary to the above configuration, the lower edge is separated upward from the upper edge, and two peaks may be formed in the intensity distribution of the high beam light distribution pattern 105 as described above. However, in the above configuration, the lower edge of the additional light distribution pattern 103 moves upward after the movement of the upper edge of the low beam light distribution pattern 101, and thus, the lower edge can be suppressed from being separated upward from the upper edge. Therefore, formation of the valley between two peaks described above can be suppressed, and deterioration in visibility can be suppressed.

The controller CO may start and end the movement of the lower edge of the additional light distribution pattern 103 during a period between the start and the end of the upward movement of the upper edge of the low beam light distribution pattern 101, or may start the movement of the lower edge, for example, 10 seconds after the end of the movement of the upper edge. Further, the controller CO may start and end the movement of the lower edge of the additional light distribution pattern 103 simultaneously with the start and end of the movement of the upper edge of the low beam light distribution pattern 101. In addition, the controller CO may move the lower edge of the additional light distribution pattern 103 upward before the upper edge of the low beam light distribution pattern 101, or may move the lower edge simultaneously with the upper edge. In this case, the controller CO may start the upward movement of the upper edge of the low beam light distribution pattern 101 simultaneously with the end of the movement of the lower edge of the additional light distribution pattern 103, or may start the upward movement of the upper edge of the low beam light distribution pattern 101, for example, 10 seconds after the end of the movement of the lower edge of the additional light distribution pattern 103. Alternatively, the controller CO may start and end the upward movement of the upper edge of the low beam light distribution pattern 101 between the start and end of the movement of the lower edge of the additional light distribution pattern 103. The controller CO may combine the above with a timing of each of the start of the movement of the upper edge of the low beam light distribution pattern 101, the end of movement of the upper edge, the start of the movement of the lower edge of the additional light distribution pattern 103, and the end of the movement of the upper edge.

Further, the controller CO may start and end the upward movement of the lower edge of the additional light distribution pattern 103 during the temperature derating. Alternatively, the controller CO may start and end the movement of the lower edge of the additional light distribution pattern 103 before the start of the temperature derating, or may perform the temperature derating during a period between the start and the end of the movement of the lower edge of the additional light distribution pattern 103. Alternatively, the controller CO may perform the temperature derating, for example, one second after the end of the movement of the lower edge. The controller CO may combine the above with a timing of each of the start of the movement of the lower edge, the end of the movement of the lower edge, the start of the temperature derating, and the end of the temperature derating.

In a case of performing the temperature derating on the second light source unit 40, the controller CO may simultaneously perform step SP12 of moving the upper edge of the low beam light distribution pattern 101 upward and step SP14 of moving the lower edge of the additional light distribution pattern 103 upward. In this case, the controller CO may set a movement speed of the lower edge of the additional light distribution pattern 103 to be equal to or lower than the movement speed of the upper edge of the low beam light distribution pattern 101.

When the lower edge of the additional light distribution pattern 103 moves upward simultaneously with the upper edge of the low beam light distribution pattern 101, but the movement speed of the lower edge is higher than the movement speed of the upper edge contrary to the above configuration, the lower edge is separated upward from the upper edge, and two peaks may be formed in the intensity distribution of the high beam light distribution pattern 105 as described above. However, in the above configuration, the lower edge of the additional light distribution pattern 103 moves upward simultaneously with the upper edge of the low beam light distribution pattern 101, and the movement speed of the lower edge is equal to or lower than the movement speed of the upper edge. As a result, it is possible to suppress the lower edge from being separated upward from the upper edge. Therefore, formation of the valley between two peaks described above can be suppressed, and deterioration in visibility can be suppressed. The controller CO does not have to set the movement speed of the lower edge of the additional light distribution pattern 103 to be equal to or lower than the movement speed of the upper edge of the low beam light distribution pattern 101.

In the embodiment, the first light emitting unit 23 is described as one LED, and the second light emitting unit 43 is described as an LED array. However, the configurations of the first light emitting unit 23 and the second light emitting unit 43 are not limited thereto. Examples of a modification of each of the first light emitting unit 23 and the second light emitting unit 43 include a micro LED. In this case, the first light emitting unit 23 and the second light emitting unit 43 have substantially the same configuration, and thus, a description will be provided using the first light emitting unit 23.

Figure 9:
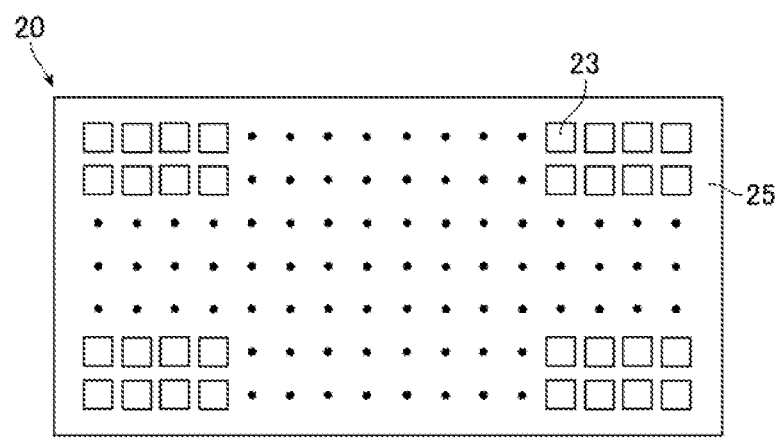
FIG. 9 is a view illustrating a modification of a first light emitting unit.

FIG. 9 is a view illustrating a modification of the first light emitting unit 23. The first light emitting units 23 are arranged in a matrix and arranged in the vertical direction and the horizontal direction. The number of first light emitting units 23 is 256 in the horizontal direction and 64 in the vertical direction, but the number of first light emitting units 23 is not particularly limited. The first light emitting units 23 are preferably a so-called micro LED array. The controller CO can perform control to individually change whether or not to emit the first light from the first light emitting unit 23 and change the light emission amount.

The controller CO can form a predetermined low beam light distribution pattern 101 by selecting the first light emitting unit 23 to emit light. In addition, the controller CO can adjust a light intensity distribution in the low beam light distribution pattern 101 by adjusting the light emission amount of each of the first light emitting units 23.

Figure 10:
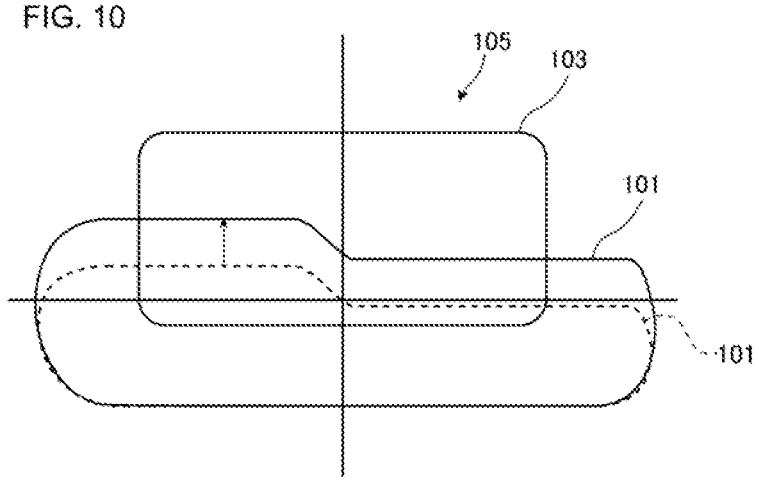
FIG. 10 is a view illustrating a modification of the change of the low beam light distribution pattern in step SP12.

In a case where the first light emitting units 23 are arranged in a matrix, the controller CO may move the upper edge of the low beam light distribution pattern 101 upward and maintain the lower edge of the low beam light distribution pattern 101 as indicated by a solid line in FIG. 10 in step SP12. In this case, the controller CO controls the first light emitting unit 23 in such a way that some of the first light emitting units 23 keep emitting light, and, among the other some first light emitting units 23, the first light emitting units 23 that need to emit light to form the light distribution pattern indicated by the solid line in FIG. 10 emit the first light, thereby instantaneously moving the upper edge of the low beam light distribution pattern 101 upward. According to such control, the lower edge side of the additional light distribution pattern 103 that becomes dark by the temperature derating can be instantaneously brightened, and the actuator 30 can be unnecessary.

In a case of causing all the first light emitting units 23 that need to emit light among the other some first light emitting units 23 to rapidly emit light, the low beam light distribution pattern 101 indicated by a dotted line in FIG. 10 is instantaneously changed to the low beam light distribution pattern 101 indicated by the solid line. In a case where the first light emitting units 23 that need to emit light among the other some first light emitting units 23 emit the first light in order from the first light emitting unit 23 close to the first light emitting unit 23 that is already emitting light to form the low beam light distribution pattern 101 indicated by the dotted line, the low beam light distribution pattern 101 indicated by the dotted line in FIG. 10 is gradually changed to the low beam light distribution pattern 101 indicated by the solid line.

Figure 11:
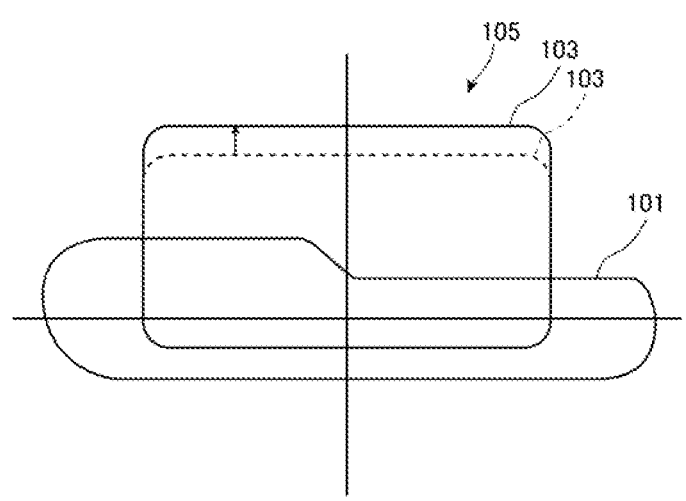
FIG. 11 is a view illustrating a modification of the change of the additional light distribution pattern in step SP14.

In a case where the second light emitting units 43 are arranged in a matrix, the controller CO may move the upper edge of the additional light distribution pattern 103 upward and maintain the lower edge of the additional light distribution pattern 103 as illustrated in FIG. 11 in step SP14. In this case, the controller CO controls the second light emitting unit 43 in such a way that some of the second light emitting units 43 keep emitting light, and, among the other some second light emitting units 43, the second light emitting units 43 that need to emit light to form the light distribution pattern indicated by a solid line in FIG. 11 emit the second light, thereby instantaneously moving the upper edge of the additional light distribution pattern 103 upward. According to such control, the actuator 50 becomes unnecessary, and the second light can be instantaneously emitted far away.

Even in a case where the first light emitting units 23 and the second light emitting units 43 are arranged in a matrix, the first light and the second light emitted from the lamp unit 4 may be inclined upward using the actuators 30 and 50 as in the embodiment.

Although the present invention has been described with reference to the above-described embodiment as an example, the present invention is not limited thereto.

The controller CO may move at least the upper edge of the low beam light distribution pattern 101 upward in step SP12 as the temperature T of the second light source unit 40 increases. The higher the temperature T, the darker the additional light distribution pattern 103 becomes due to the temperature derating. In the above configuration, the upper edge of the low beam light distribution pattern 101 moves upward as the additional light distribution pattern 103 becomes darker, and thus, the upper edge side of the low beam light distribution pattern 101 can brighten the lower edge side of the additional light distribution pattern 103 which becomes dark due to the temperature derating. Therefore, deterioration in visibility can be suppressed. In addition, the controller CO may move at least the upper edge of the additional light distribution pattern 103 upward in step SP14 as the temperature T increases. As described above, the higher the temperature T, the darker the center side of the additional light distribution pattern 103, and the darker the upper edge side. When the upper edge side becomes darker, the driver visually tends to feel uncomfortable as if the upper edge of the additional light distribution pattern 103 is lowered and the additional light distribution pattern 103 is vertically narrowed. In the above configuration, the upper edge of the additional light distribution pattern 103 moves upward, and thus, the area where the line of sight of the driver is directed when the driver visually recognizes a far place becomes bright, and it is suppressed that the driver feels uncomfortable as if the upper edge is lowered.

In the control flow, step SP14 may be omitted. In addition, the order of step SP12, step SP13, and step SP14 is not particularly limited, and some steps may be performed simultaneously. In addition, the upward movement amount of the upper edge of the low beam light distribution pattern 101 may be the same as, smaller than, or larger than the upward movement amount of the upper edge of the additional light distribution pattern 103. The upward movement amount of the low beam light distribution pattern 101 may be equal to or larger than the upward movement amount of the additional light distribution pattern 103. In step SP12, the controller CO may move at least the upper edge of the low beam light distribution pattern 101 upward gradually, stepwise, or instantaneously. The controller CO may move at least the upper edge of the additional light distribution pattern 103 upward gradually, stepwise, or instantaneously.

The controller CO performs the temperature derating based on the duty ratios 43aD to 431h, and may perform the temperature derating based on a current flowing through the second light emitting units 43a to 43h. Therefore, the controller 70 may perform the temperature derating based on the power supplied to the second light emitting units 43a to 43h.

The outer cover 12 does not have to be provided in the first casing 21 and the second casing 41. The configuration of the first light source unit 20 including the first light emitting unit 23 is not particularly limited as long as the first light can form the low beam light distribution pattern. Further, the configuration of the second light source unit 40 including the second light emitting unit 43 is not particularly limited as long as the second light can form the additional light distribution pattern.

According to the present invention, there is provided a vehicle headlight capable of suppressing deterioration in frontal visibility when temperature derating is performed, and the vehicle headlight can be used in the field of automobiles and the like.

The invention claimed is:

1. A vehicle headlight comprising:
a first light source unit that emits first light for forming a low beam light distribution pattern to a front of a vehicle;
a second light source unit that emits second light for forming an additional light distribution pattern to be added to the low beam light distribution pattern to form a high beam light distribution pattern; and
a controller,
wherein the controller moves at least an upper edge of the low beam light distribution pattern upward in a case of performing temperature derating on the second light source unit based on a temperature of the second light source unit in a state where the high beam light distribution pattern is formed.

2. The vehicle headlight according to claim 1, wherein the controller moves the upper edge of the low beam light distribution pattern upward before the temperature derating in a case of performing the temperature derating on the second light source unit.

3. The vehicle headlight according to claim 1, wherein the controller increases a movement amount of the upper edge of the low beam light distribution pattern according to a traveling speed of the vehicle in a case of performing the temperature derating on the second light source unit.

4. The vehicle headlight according to claim 1, wherein the controller moves at least an upper edge of the additional light distribution pattern upward in a case of performing the temperature derating on the second light source unit.

5. The vehicle headlight according to claim 1, wherein the controller moves a lower edge of the additional light distribution pattern upward by a smaller movement amount than the upper edge of the low beam light distribution pattern in a case of performing the temperature derating on the second light source unit.

6. The vehicle headlight according to claim 1, wherein the controller moves a lower edge of the additional light distribution pattern upward after the movement of the upper edge of the low beam light distribution pattern in a case of performing the temperature derating on the second light source unit.

* * * * *